United States Patent [19]

Bachmann et al.

[11] Patent Number: 5,131,167

[45] Date of Patent: Jul. 21, 1992

[54] METHOD AND APPARATUS FOR DRYING TRANSFORMER PARTS

[75] Inventors: Josef Bachmann, Heimbuchenthal; Wolfram Diemar, Clausthal-Zellerfeld, both of Fed. Rep. of Germany

[73] Assignee: Leybold Aktiengesellschaft, Hanau, Fed. Rep. of Germany

[21] Appl. No.: 460,830

[22] Filed: Jan. 4, 1990

[30] Foreign Application Priority Data

Aug. 24, 1989 [DE] Fed. Rep. of Germany ....... 3927964

[51] Int. Cl.$^5$ .............................................. F26B 3/34
[52] U.S. Cl. ........................................ 34/1 B; 34/1 R
[58] Field of Search ................ 34/1, 17, 60, 1 R, 1 A, 34/1 B; 219/10.57, 10.75, 10.77, 10.79, 56

[56] References Cited

FOREIGN PATENT DOCUMENTS 2715084 11/1977 Fed. Rep. of Germany .
2641294 3/1978 Fed. Rep. of Germany .
3111756 1/1982 Fed. Rep. of Germany .
3029311 3/1982 Fed. Rep. of Germany .
240461 10/1986 German Democratic Rep. .

OTHER PUBLICATIONS

Leistungselektronik, vol. 2, Springer-Verlag, Vienna & New York Grundlagen der Leistungselektronik-Heumann, 1975, pp. 107–109.
Transformer Drying Equipment-National Industri, Drammen, Norway.

Primary Examiner—Henry A. Bennet
Attorney, Agent, or Firm—Felfe & Lynch

[57] ABSTRACT

The invention relates to a power supply for the electric drying of transformer parts, particularly paper insulation of the windings. For this purpose, a converter is selected as a voltage source which converts an alternating voltage, e.g. alternating supply voltage of 50 Hz, into a variable frequency in the range of 0 and 25 Hz.

5 Claims, 3 Drawing Sheets

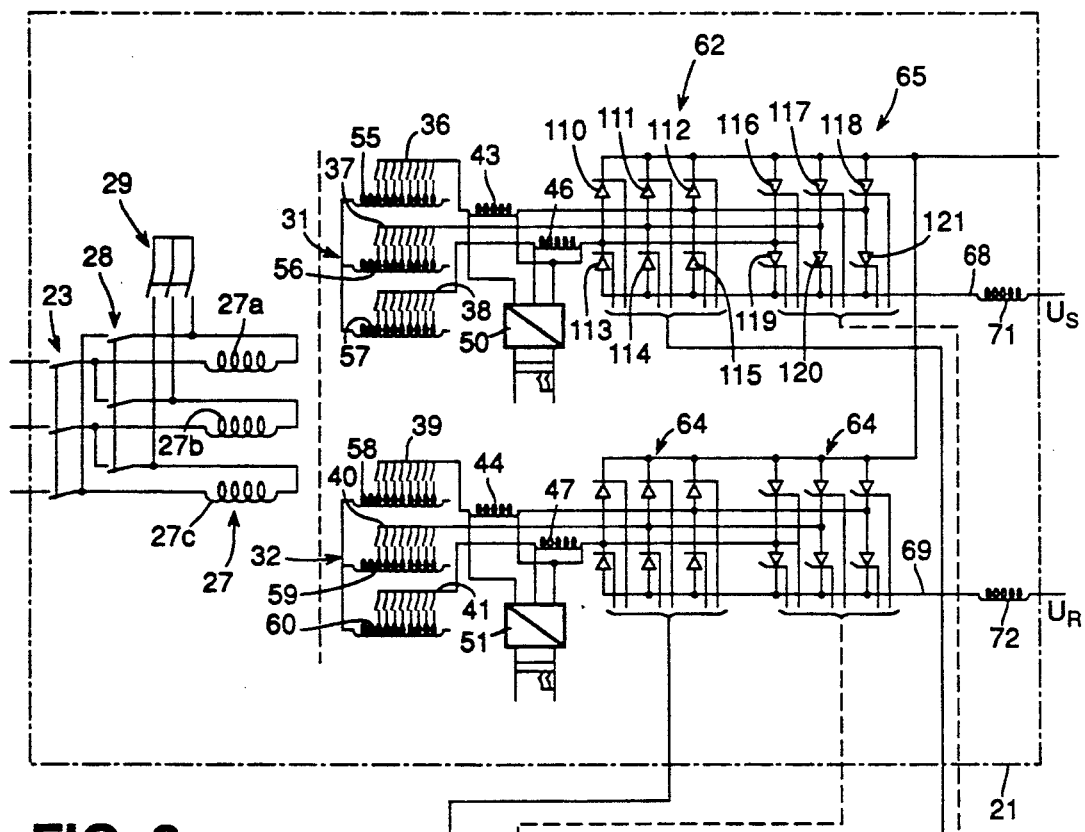
FIG. 3
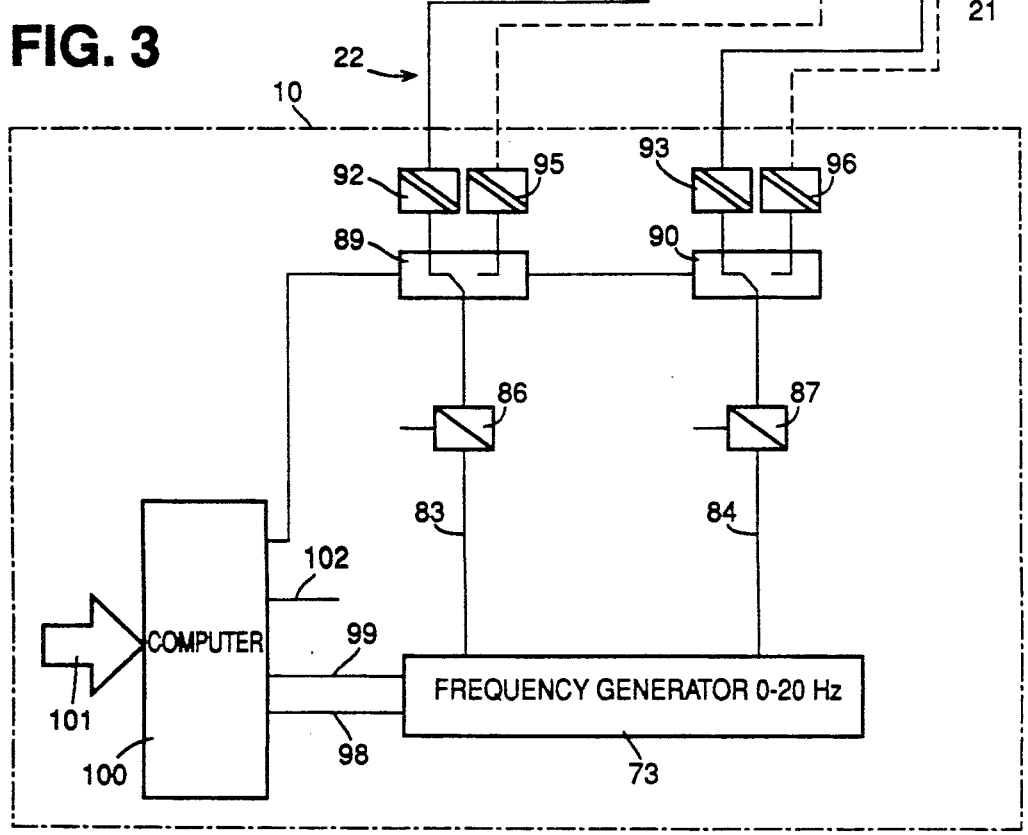

1

METHOD AND APPARATUS FOR DRYING TRANSFORMER PARTS

BACKGROUND OF THE INVENTION

The invention relates to a power supply for electrically drying transformer parts.

When manufacturing transformers, it is essential to dry so-called active parts before the transformers are sold or put into operation. Active parts of this kind are, for example, electrical insulation of the transformer windings which were impregnated in oil or in chlorinated hydrocarbons or were moistened with water for certain reasons.

The transformer parts can be dried from the outside by producing and exposing the windings to warm air. However, it is also possible to dry the windings by using the heat generated by an electrical current which is sent through the windings.

When a transformer is electrically dried, a chamber is provided for receiving the transformer to be dried. The temperature and pressure of the chamber is automatically controlled and the high voltage windings of the transformer are supplied power from an electric power source. The low voltage windings of the transformer are short-circuited such that the short-circuit current dries the transformer windings.

A regular distribution transformer can be dried in approximately six hours. This means that the entire drying process can be carried out within the limits of an 8-hour work day. When the electric power is used for drying the insulation, only a small amount of the energy is used for heating the core, the surrounding air and the container. The electrical method requires only approximately one third of the energy necessary for conventional drying processes. During these conventional drying processes it often occurs that a cloud of oil vapor escapes into the building when the drying chamber is opened once the drying process is completed. This disadvantage is avoided when the electrical method is used.

It is already known to carry out electric drying by applying 20 Hz. voltage to the high voltage winding of the transformer and short-circuiting the low voltage winding (cf. "Transformer Drying Equipment", a brochure of National Industri, Drammen, Norway). In this example, the low-frequency voltage is used to sufficiently reduce the short circuit voltage so as to avoid flashover in the transformer when the pressure is decreased during the drying process. This known method permits the simultaneous drying of several transformers with ratings which vary from 30 to 2000 kVA. All drying variables such as power, voltage, pressure, oil level, and time are controlled by a programmable logic controller. The drying process itself is divided into three cycles. During the first cycle the transformer is heated under normal air pressure to 110° C. so as to achieve a heat transfer to the insulating parts. Subsequently, in a second cycle the transformer is heated to 150° C. and, simultaneously, air is evacuated to 30 mbar. The evacuation will evaporate as much water as is necessary to expel the oxygen from the tank; however, the pressure must be high enough to prevent flashovers in the transformer. In a third cycle the evacuation is continued down to less than 0.5 bar, without heating.

A disadvantage of this known electric drying method is that a 20 Hz generator, including a downstream regulating transformer, are required as a power source. The regulating transformer only permits adjusting the voltage applied to the transformer.

SUMMARY OF THE INVENTION

It is an object of the invention to improve the known method of electrically drying transformers, and particularly drying the paper insulation of the windings which have unavoidable water voids, by means of a simple frequency reduction.

This object, as well as other objects which will become apparent from the discussion that follows, are achieved, according to the present invention, by providing for continuous adjustment of the output voltage and output frequency in the range of 0 to 20 Hz. For each type of transformer both frequency and voltage can, therefore, be adjusted in accordance with the original inductance of the transformer. It is thus possible to minimize the voltage drops due to stray currents within the transformer and to reduce the voltage stress on the transformer.

In accordance with a preferred feature of the present invention, the power source is operative to send direct current though the drying transformer. As distinct from the prior known electrical drying method, the primary and secondary winding temperature is continuously determined during the heating phase by supplying direct current.

For a full understanding of the present invention, reference should now be made to the following detailed description of the preferred embodiments of the invention and to the accompanying drawings.

BRIEF DESCRIPTION OF THE DRAWINGS

FIG. 3 shows power supply in accordance with a second preferred embodiment of the invention including a transformer the secondary side of which has two phases ($U_R$, $U_S$) each of which is connected to two antiparallel switched bridges.

DESCRIPTION OF THE PREFERRED EMBODIMENTS

Figure 1:
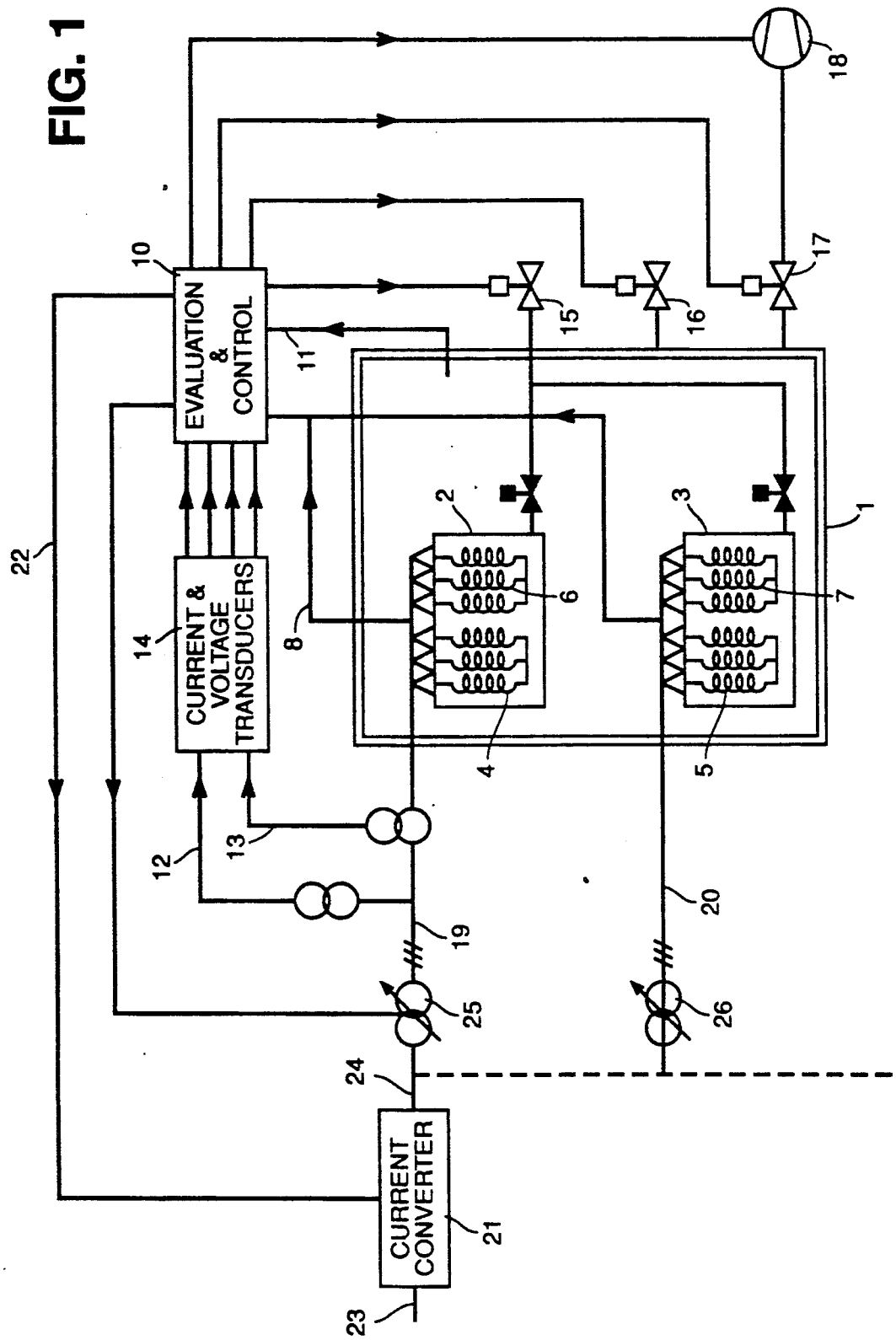
FIG. 1 shows a drying chamber for several transformers in which the paper insulations of transformer windings are electrically dried.

FIG. 1 shows a drying chamber 1 including two transformers 2, 3 the primary windings 4, 5 of which are connected to a power source and the secondary windings 6, 7 of which are short-circuited. The physical conditions which prevail in the drying chamber are sensed by several sensor lines. The oil levels in the transformers 2, 3, for example, are sensed via lines 8, 9 and supplied as data to the evaluation and control unit 10. A further sensor line 11 senses the instantaneous pressure in the chamber 1 and supplies this information to the evaluation and control unit 10. The values of voltage and current which are applied to the transformers 2, 3 are supplied via sensor lines 13, 14 to a voltage/current transducer 14 which, in turn, is connected to the evaluation and control unit 10. Based in the aforementioned data the evaluation and control unit 10 controls and regulates several devices; for example, an oil valve 15, an air inlet valve 16, an air outlet valve 17 and a vacuum pump 18.

Electrical power is supplied to the transformers 2, 3 via power lines 19, 20 from a converter 21. The term "converter", as used herein, is intended to mean a current converter which does not change the current type—i.e., either alternating current or direct current. The present invention uses alternating or three-phase current. An alternating current converter permits changing the system paramaters of voltage, frequency, phase number, and phase sequence. Converters without an intermediate circuit are referred to as "direct converters". Converters of this type are preferably used in the present invention. Advantageously, the invention employs a three phase alternating current converter in a circular current free B6C circuit. The character B indicates a bridge circuit whereas the digit 6 indicates the number of the pulses. A "B6" circuit is, therefore, a six pulse bridge circuit, also referred to as a three phase bridge circuit (cf. F. Fach: *Leistunqselektronik*, Vol. 2, Springer-Verlag, Vienna and New York (1988) Table 6.1, page 558, third column from the right).

Figure 2:
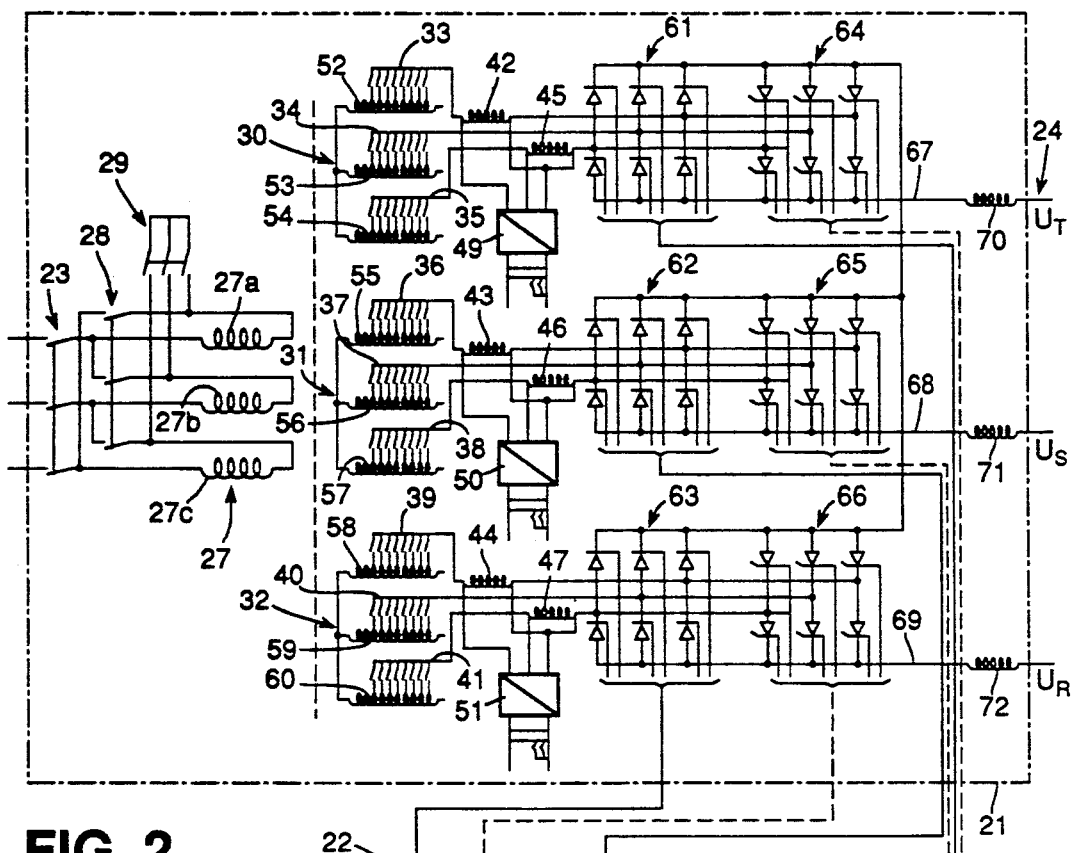
FIG. 2 shows a power supply in accordance with one preferred embodiment of the invention including a three-phase current transformer, the secondary side of which is connected to two antiparallel switched bridges per phase ($U_R$, $U_S$, $U_T$).
Figure 2:
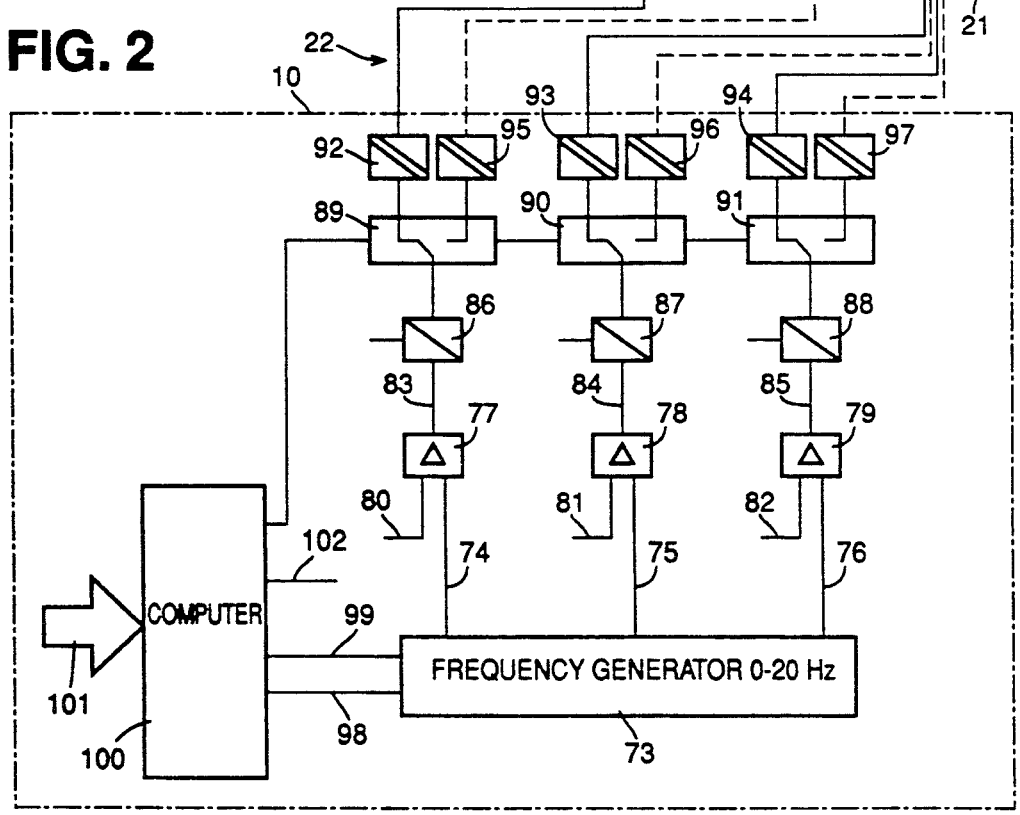

FIG. 2 shows a first embodiment of the power source in accordance with the invention, illustrating the converter 21 as well as the circuit for controlling its thyristors via lines 22. The portion of the evaluation and control unit 10 which is necessary for control of the thyristors of the converter 21 is also shown in FIG. 2. It can be seen that the converter 21 is an alternating current converter in a B6C circuit. The input 23 of this converter is connected, for example, to a three-phase alternating voltage of 3×380 V at 50 Hz whereas the output 24 thereof is connected to the transformers 2, 3 shown in FIG. 1. If necessary, regulating units 25, 26, as indicated in FIG. 1, can be provided between the converter 21 and the transformers 2, 3.

A converter of the type represented in FIG. 2 is basically known (cf. K. Heumann, Grundlagen der Leistungselektronik, 1975, p. 107 to 109, particularly Figure 7.32). This is a direct converter which serves as a control converter. In a control converter the output voltage of two antiparallel operating partial-current converters is sinusoidally modulated. In this case, the control angle of each semioscillation of the output voltage must be continuously modified. It is an object of the present invention to modify the known three-phase direct converter in such a manner that it can be economically used for electrodrying.

As can be seen in FIG. 2, the primary side 27 of the three phase converter which includes the individual windings 27a, 27b, 27c can be switched between a star and delta connection by means of switches 28 and 29. In FIG. 2 the positions of the switches 28 and 29 are such that they result in a star connection. On the secondary side three star-connected phases 30, 31, 32 are provided the windings 52 to 60 which have taps 33, 34, 35 and 36, 37, 38, and 39, 40, 41, respectively. They serve to avoid a high control reactive power and to reduce harmonic oscillations in the output voltage. If a rectifier supplies a reduced rectified voltage with a constant current and constant supply voltage, this results, as is commonly known, in a control reactive power. If the supply voltage is reduced, this results, when $U_d$ remains unchanged, in a lower apparent power and, hence, in an improved reactive power, i.e., the cos $\phi$ is improved.

Voltage sensors 42, 43, 44 and current sensors 45, 46, 47 are connected subsequent to the secondary windings 30, 31, 32. These sensors supply the sensed voltage and current values via signal matching elements 49, 50, 51 to the evaluation and control unit 10. The individual windings 52, 53, 54 and 55, 56, 57, and 58, 59, 60 of the secondary windings 30, 31, 32 are each connected to a first six pulse bridge circuit 61 and 62 and 63, respectively, and to a second six pulse bridge circuit 64, 65, 66. The six pulse bridge circuits 61 to 66 each include six thyristors which are actuated via lines 22. The thyristors are actuated such that a sinusoidal output voltage is applied to the output lines 67, 68 and 69, the frequency of which can be modified. The form of the output voltages on lines 67–69 can be approximated as far as possible to the sinusoidal form by means of downstream inductors 70, 71, 72.

The output alternating voltages $U_R$, $U_S$, $U_T$, the frequencies and amplitudes of which can be controlled, are then supplied to the three phases of the primary winding 4 of the transformer 2 and/or the three phases of the primary winding 5 of the transformer 3 (FIG. 1) and/or the three phases of the primary windings of additional transformers (not shown). One single converter 21 can thus simultaneously or successively supply power to several transformers 2, 3.

As already mentioned, the output voltages $U_R$, $U_S$, $U_T$ are caused to approximate, as far as possible, a prescribed sinusoidal desired value. Both partial current rectifiers 61, 64 of each phase operate alternately as a rectifier or inverter.

The difference in the output voltages of both partial current rectifiers 61, 64 form circular voltages which cause circular currents. In order to avoid circular currents, it is possible to use circular current free circuits also for the control converter. A dead time occurs when the current is reversed. In case a control rectifier is used, the indicated frequency of the voltages $U_R$, $U_S$, $U_T$ can be continuously varied with the significant restriction that the output frequency $f_2$ can be adjusted only such that it matches half the value of the input frequency $f_1$. Therefore, with an input frequency $f_1$ of 50 Hz the output frequency can be varied from 0 (direct current) to only 25 Hz. Frequencies above 25 Hz are not possible. This limitation can be understood from the formula:

$$\frac{f_2}{f_1} = \frac{1}{1 + \frac{2(n-1)}{p_1}}$$

wherein n=peak number and $p_1$=pulse number. Because of the switching intervals in the circular current free circuit, there results a frequency range from 0 to approximately 20 Hz. when $f_1$ is 50 $H_Z$. Furthermore, the control converter has a high reactive power demand from the three-phase current supply net since it is predominantly operated by phase control.

For actuating the thyristors in the six pulse bridge circuits 61 to 66, a frequency generator 73 is provided in the evaluation and control unit 10. The output frequency of this generator can be adjusted between 0 Hz and 20 Hz. This frequency generator 73 can produce output signals which correspond to the desired currents in the R-phase 69, the S-phase 68 and the T-phase 67. The desired currents are compared to the actual currents in the comparators 77, 78, 79. The actual currents are supplied to these comparators via the signal matching elements 49 to 51 and the lines 80, 81, 82.

The pulse converters 86, 87, 88 convert information available as direct current signals at the output lines 83, 84, 85 into pulses which are then supplied via switches 92, 93, 94 and 95, 96, 97, respectively, to pulse stages the outputs of which are connected to control electrodes of the thyristors of the bridge circuits. The desired frequencies of the frequency generator 73 and the desired amplitudes of the output signals of the frequency generator 73 are prescribed by a computer 100 via lines 98 and 99. This computer in turn, evaluates the data supplied via lines 8, 9, 11, 12, 13 (FIG. 1). In FIG. 2 these lines are referenced by the arrow 101.

The control device 10 strongly reduces the complexity of the control. The computer directly controls the current direction since it is not necessary to minimize the currentless pause for the heating process. Preferably, on the output side 67, 68, 69 of the converter there are provided high-precision transformers 122 according to the Hall-principle, e.g. transformers manufactured by the German firm of Holec under the brand name "Zeroflux"—which are connected to the computer. These transformers, and the voltage directly measured at the transformer 2, are used to continuously monitor the winding temperature.

A sinusoidal output current can be obtained by means of the comparators 77, 78, 79. Using a sinusoidal vertical control (cf. Zach, loc. cit. p. 397, Fig. 5.1b), however, these comparators can be omitted. Generally, the sinusoidal vertical control is used only for mid-point circuits; in accordance with the invention, however, it is also used for the bridge circuit.

FIG. 3 shows a variant wherein the transformers 27, 31 and 32 generate only two voltage phases. Those elements which are identical to the elements in FIG. 2 are identified by the same reference numerals. Both six pulse bridges 62 and 65, including the thyristors 110 to 115, are connected in anti-parallel. As is generally known, an alternating voltage with a lower frequency $f_2 < f_1$ can be generated by means of a suitable control via the two antiparallel partial current rectifiers 62, 65 to which an alternating current is supplied with frequency $f_1$. During this operation each of the two rectifiers 62, 65 is alternatingly fired for a few semioscillations. The one rectifier 62 supplies positive voltages to the output while the other rectifier 65 supplies negative voltages. By means of the sinusoidal vertical control the resulting output voltage can approximate the sinusoidal form without the need for additional control.

The process for drying the transformer parts is carried out as follows:

The voltage source 21 is applied to a winding 4 of the transformer 2 whereas the other winding 6 of this transformer 2 is short-circuited. Subsequently, the transformer windings 4 to 7 are heated to approximately 110° C. average winding temperature under atmospheric pressure. Subsequently, the transformer windings 4 to 7 are heated further to approximately 150° C. while the pressure is simultaneously decreased to approximately 30 mbar. Thereafter, with the electric heating shut off, the pressure is reduced to 0.5 mbar or less. Now the transformer 2, 3 is filled with insulating oil.

When the transformer windings 4 to 7 are heated to 150° C., the delta-star-connection 28 in the primary winding 27 of the current rectifying transformer 27, 30, 31, 32 of the converter 21 so reduces the highest possible voltage ($U_R$, $U_S$, $U_T$) that a gas discharge in the transformer is positively prevented.

There has thus been shown and described a novel method and apparatus for drying transformer parts which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In apparatus for the electric drying of parts of a transformer having at least two windings, said apparatus including a voltage source coupled to one winding of the transformer and means for short circuiting another winding of the transformer, the improvement wherein said voltage source comprises means for converting an alternating voltage of a first frequency into an alternating voltage of a second frequency, and wherein a primary side of a three-phase voltage transformer has one winding per phase, wherein the secondary side of this transformer has three windings per phase, wherein each of the three windings is connected to at least one thyristor bridge circuit and wherein the thyristors of the thyristor bridge circuit are controlled by means of a frequency generator.

2. The apparatus defined in claim 1, wherein each of the three windings is connected to two bridge circuits, one bridge circuit being connected in antiparallel with the other bridge circuit.

3. The apparatus defined in claim 1, wherein said frequency generator includes means for changing the frequency and amplitude of its output.

4. The apparatus defined in claim 3, wherein said output of said frequency generator determines the desired values of the currents in the R, S and T phases of the transformer in said converter means.

5. In apparatus for the electric drying of parts of a transformer having at least two windings, said apparatus including a voltage source coupled to one winding of the transformer and means for short circuiting another winding of the transformer, the improvement wherein said voltage source comprises means for converting an alternating voltage of a first frequency into an alternating voltage of a second frequency, and wherein high-precision transformers that operate according to the Hall principle are disposed between said converter means and the transformer, for determining the temperature of the transformer.

* * * * *